United States Patent [19]

Heninger et al.

[11] Patent Number: 5,034,982
[45] Date of Patent: Jul. 23, 1991

[54] LENTICULAR SECURITY SCREEN PRODUCTION METHOD

[75] Inventors: Bryne E. Heninger, Oakwood; Philip B. Sullivan, Cornelia, both of Ga.

[73] Assignee: Dittler Brothers, Inc., Atlanta, Ga.

[21] Appl. No.: 293,118

[22] Filed: Jan. 3, 1989

[51] Int. Cl.5 .......................... H04K 1/00; B42D 15/00
[52] U.S. Cl. ............................................ 380/54; 380/9; 273/139; 283/94; 283/102; 283/903
[58] Field of Search .................. 380/54; 350/130, 131, 350/167; 283/17, 73, 94, 102, 903; 273/139

[56] References Cited

U.S. PATENT DOCUMENTS

| | | | |
|---|---|---|---|
| 1,592,034 | 7/1926 | Macy | 350/131 |
| 1,882,424 | 10/1932 | Ives | 350/131 |
| 1,984,004 | 12/1934 | Wildhaber | 350/131 |
| 1,989,552 | 1/1955 | Kawolt | 350/130 |
| 2,815,310 | 12/1956 | Anderson | 156/64 |
| 2,952,080 | 9/1960 | Avakian et al. | 380/54 |
| 3,178,993 | 4/1965 | Ferris et al. | 380/54 |
| 3,241,429 | 3/1966 | Rice et al. | 350/167 |
| 3,524,395 | 8/1970 | Alasia | 354/112 |
| 3,676,000 | 7/1972 | Mayer, Jr. et al. | 355/52 |
| 3,692,312 | 9/1972 | Meyer | 350/131 |
| 3,769,890 | 11/1973 | Alasia | 354/112 |
| 3,781,104 | 12/1973 | Dubuisson | 355/22 |
| 3,914,877 | 10/1975 | Hines | 380/54 |
| 3,937,565 | 2/1976 | Alasia | 350/320 |
| 4,092,654 | 5/1978 | Alasia | 354/112 |
| 4,198,147 | 4/1980 | Alasia | 354/115 |

Primary Examiner—Stephen C. Buczinski
Assistant Examiner—Bernarr Earl Gregory
Attorney, Agent, or Firm—Kilpatrick & Cody

[57] ABSTRACT

A method for producing a scrambled image for deciphering by a lenticular lens having a specific regular lineation, by exposing two photographic film negatives to two desired images and processing each film negative to form two image negatives, and by contacting and exposing one of said image negatives to a working negative through a first grating screen having the same regular lineation as the lenticular lens, to create a lineated image of said first image negative on said working negative, and then contacting and exposing the other image negative to said working negative through a second grating screen having the same regular lination as the lenticular lens, whereby said second grating screen is aligned with respect to said working negative complementary to the alignment of said first grating screen during said first contacting and exposing step such that lineated images of one negative are formed on said working negative which are parallel to and between the lineations of the image of the other image negative. The working negative is then exposed to create the desired positive scrambled lineated image.

14 Claims, 2 Drawing Sheets

LENTICULAR SECURITY SCREEN PRODUCTION METHOD

THE BACKGROUND OF THE INVENTION

The invention pertains to an improved method of producing scrambled images which can be used in a method for improving the security of printed matter. Many printed documents can have significant financial value, such as securities, government checks, lottery tickets or game cards. Of course, the temptation always exists to reproduce or counterfeit such documents for financial gain. Especially in the case of high volume items with uncontrolled distribution, such as lottery tickets, where ownership is impossible to track, an inexpensive and flexible method is necessary to inhibit and in detection of such unauthorized replication.

Numerous methods exist to try to accomplish the above goals of various sophistication and expense. These can range from the choice of special materials to complicated printed patterns, to codes hidden under removable material, and to relatively expensive devices, such as holographs, incorporated into the printed matter.

The present invention specifically relates to the use of multiple interlineated images to form scrambled images which cannot be perceived unless viewed through an appropriate lineated lens, such as a lenticular lens or a grating screen. That is, two or more images are superimposed on each other by having alternating linear parallel spaces in which each image is represented such that if a set of alternating linear parallel spaces is viewed by itself (for two superimposed images), one of the images would be clear. Of course, the finer the lineation, the clearer the image will be to the eye. A method of the present invention is an improved process of linear approximation of each image, and then interlineating the two sets of lines to form the scrambled image.

The general concept of forming such interlineated multiple images is well known, and is familiar in use in conjunction with lenticular lenses in novelty items which change images when the angle of observation is changed and in forms of stereoscopic images viewed simultaneously by the viewer's two eyes.

Prior art patents in the general field of interlineated images include the following:

U.S. Pat. No. 2,815,310 (Anderson) discloses a process of making changeable picture displays. The method described includes use of a lineated grating screen placed in front of the film plate of a camera as one image is photographed, and then moving the plate with respect to the grating prior to exposing the second image. The disadvantage of this method is that a complicated camera device is used in exposing the original images, which is both expensive and an inconvenient way to create the interlineated image.

U.S. Pat. No. 3,178,993 (Ferris, et al.) discloses a cryptographic device using a lenticular screen, but which is not composed of parallel linear elements and is, therefore, not capable of combining multiple images for separate viewing.

U.S. Pat. Nos. 3,524,395; 3,937,565 and 4,092,654 (all to Alasia) describe various photographic methods for creating screened images which also require complicated machinery to move the object film with respect to the images being exposed.

SUMMARY OF THE INVENTION

The present invention is an improved method of creating interlineated scrambled images for use with a lenticular screen or lens for viewing each scrambled image by proper placement of the screen.

In this application, interlineated scrambled image shall mean a visual image, for instance, a printed image, which combines two or more lineated forms of images in which the lines representing each image are parallel to each other and are contiguously alternate to each other. A lineated image is an approximation of an image composed of a series of regularly spaced parallel line positions of the image, or, in other words, an image with regularly spaced parallel blank lines in place of those portions of the image. As previously mentioned, such interlineated scrambled images are well known in novelty items or sterographs. As is also known, the closer (and, therefore, smaller) the lines of a lineated image are spaced, the closer the lineated image appears as the original image to the eye. On the other hand, the closer the lines are in an interlineated scrambled image, the more difficult it is to recognize the component images, or even to ascertain the density of the lines in the scrambled image.

Such interlineated scrambled images may be viewed through screening devices which correspond to the line density used to form the scrambled image. One such device is granticule or screen, which is essentially composed of a screen of parallel opaque lines separated by transparent spaces. If such a screen has the same line density as the scrambled lineated image and is lined up parallel to the lines in the image, one of the images will be apparent to a viewer. Another such screening device is a lenticular lens, which is formed of a series of very fine parallel partial cylindrical surfaces. If such a lenticular lens has the corresponding line density to such an interlineated scrambled image, one of the images will be apparent to the viewer, depending on the viewing angle. For the purposes of this application, any viewing devices such as a granticule or a lenticular lens will be hereinafter generally referred to as a lenticular lens.

The improved method of creating interlineated scrambled images comprises exposing the desired original images each to a photographic film negative by normal photographic methods. This avoids the need for a special camera when the original image is photographed. Each desired processed image negative is then sequentially contacted to a working negative through a thin grating screen which has a desired density of parallel opaque lines with transparent areas therebetween and is shifted perpendicular to the lines an appropriate distance for each sequential exposure. For example, in the case where two images are to appear on the interlineated scrambled image, two image negatives may be sequentially contacted and exposed to a common composite negative through an associated grating screen such that the two grating screens are aligned in a complementary manner to each other. That is, when the second image negative is contacted to the working negative, the grating screen lines are to be located relatively between where the grating screen lines were when the first image negative was exposed to the working negative. Of course, the purpose of this complementary alignment is that the lineated images of each complete image are exposed to the working negative in a parallel alternating non-overlapping manner. The resultant processed composite working negative can then be used to produce a positive film image of the lenticularly scrambled image or it may be used to expose a printing element for printing multiple copies of the image.

The process may be aided by utilizing complementary grating screens in the steps of exposing each image negative to the working negative using a pin-register system whereby the complementary grating screens are appropriately located with respect to each other by the aid of register pins when each is used in the exposure of an image negative. The grating screens may be formed by first exposing the appropriate lenticular lens to a negative film. The complementary grating screen in a pin-registry system can then be advantageously created by exposing the first exposed negative to a second negative film.

The above methods may also be accomplished by use of lenticular lenses in place of grating screens.

Additionally, color overprint tints may be included in the exposure process to produce a final scrambled image which is difficult to reproduce accurately if a non-easily reproducible color is chosen.

Therefore, it is an object of the present invention to provide an improved method of creating lenticularly scrambled images.

It is also an object of the invention that original images may be photographed in a normal fashion and that the screening process is carried out in the processing of negatives subsequent to the exposure of the actual images.

It is a further object of this invention to provide a method of creating scrambled images which requires relatively uncomplicated equipment and which allows greater flexibility in manipulation of images.

DETAILED DESCRIPTION OF THE PREFERRED EMBODIMENT

The preferred embodiment of the invention is now described with reference to the figures wherein like numbers refer to like elements throughout the views.

Figure 1:
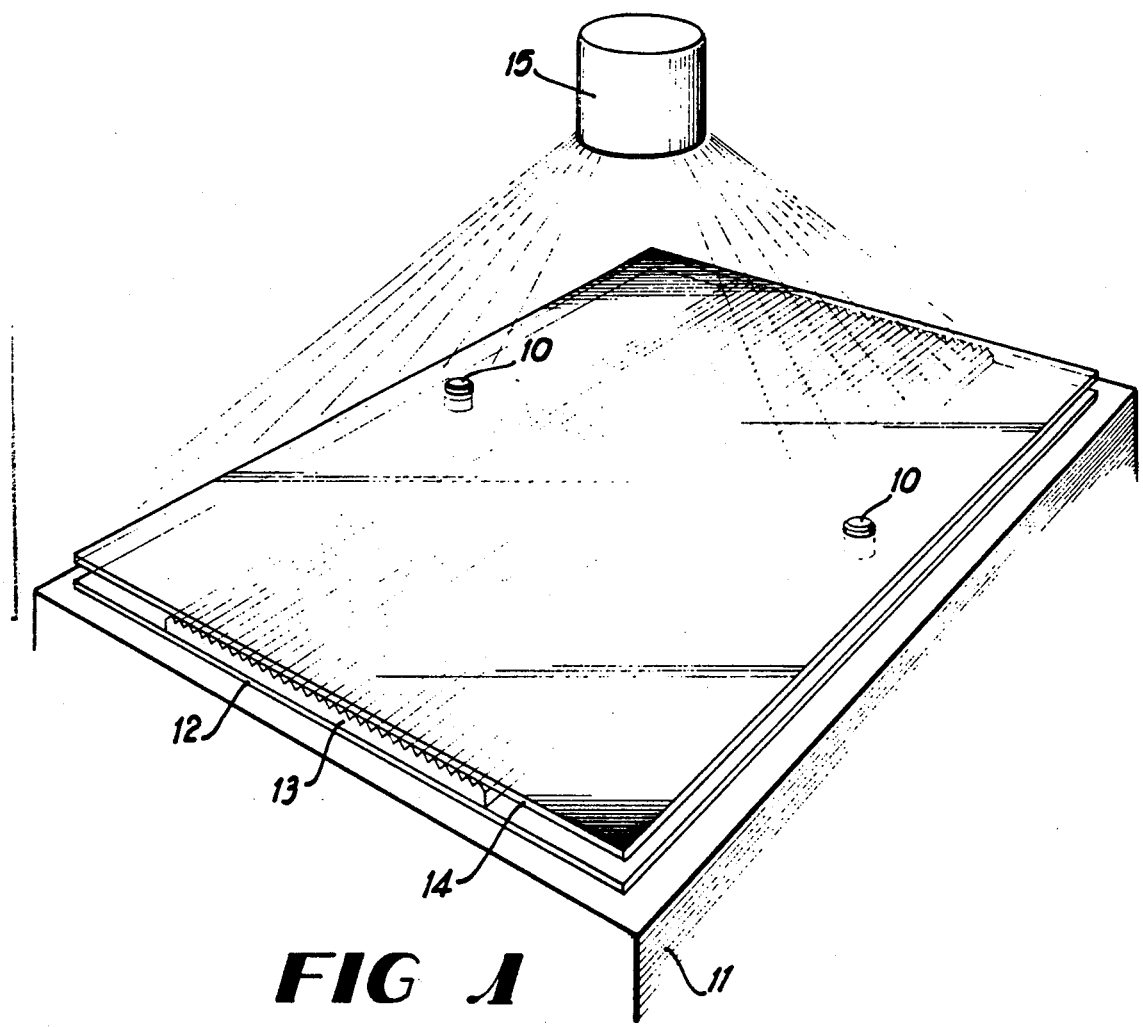
FIG. 1 is a diagram of one step of a preferred embodiment of the invention, configured to create a grating screen to be used in conjunction with the invention.

Referring to FIG. 1, a pin-register film exposure mechanism is shown, wherein all elements are aligned by means of holes through the elements which mate with the register pins 10 which may be mounted on a photographic table 11 or the like. FIG. 1 illustrates the creation of a grating screen film 12 associated with a particular lenticular lens 13 of the specification intended to be used to view the scrambled image. The grating screen is produced by exposure of the film 12 to a light source 15 directed through the lenticular lens 13 in the normal photographic method. The grating screen thus produced may be used to create the interlineated scrambled images, along with complementary grating screens also created in the same way. The complementary grating screens are created by shifting the lenticular lens 13 an appropriate distance perpendicular to the direction of its lineations. To enable this process to be done accurately, such lenticular lens may be mounted in the correct relative position to a transparent pin-register carrier 14 which may also be removably mated with the pins 10.

Figure 2:
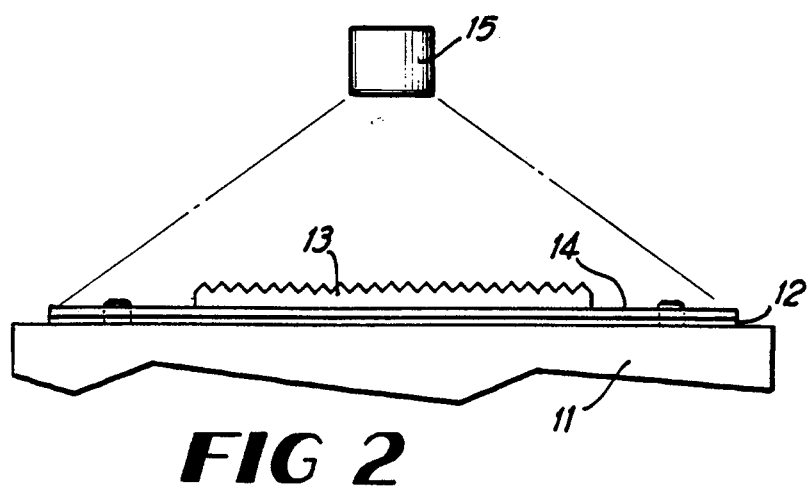
FIG. 2 is a diagram of an optional configuration for the step in FIG. 1.

FIG. 2 shows an alternate method of mounting the lenticular lens 13 on a pin-register carrier 14, in case the focal length of the lens 13 is longer than the thickness of the lens.

Figure 3:
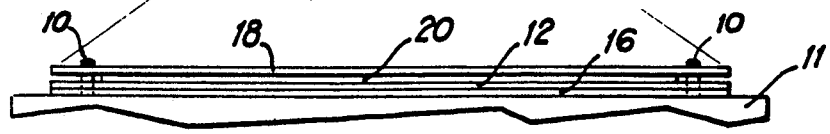
FIG. 3 is a diagram of the invention configured to expose one image through a grating screen.

FIG. 3 illustrates the method of actually creating a negative of the interlineated multiple images. A working negative film 16 is placed in registry with the pins 10 on the pin-register table 11. One of the grating screen negatives 12, such as described as being created with reference to FIG. 1 above, is placed in registry with and over the working film 16. Then the original negative 20 of one of the images is placed in contact with the grating screen 12. The image negative 20 may be mounted on another transparent carrier 18. The working film 16 is then exposed to the light source 15 through the image negative 20 and grating screen 12 to create a lineated image with unexposed parallel spaces between the exposed lines.

Subsequent images 20 may then be exposed to a common working negative 16 through a complementary grating screen 12, appropriately located by means of the pins 10. Consequently, the working negative 16 is exposed multiple times, but each time in different areas of parallel lineated space. The result is a working negative having multiple interlineated images thereon. The working negative may be used to create a positive image, by photographic means or through a printing process, which may be viewed through an appropriate lenticular lens. If the lenticular lens is correctly oriented, one of the interlineated images will appear.

Of course, the original images to be incorporated in the interlineated image are a matter of choice, and these may be created by normal photographic means, without the restriction of having to use special equipment.

Figure 4:
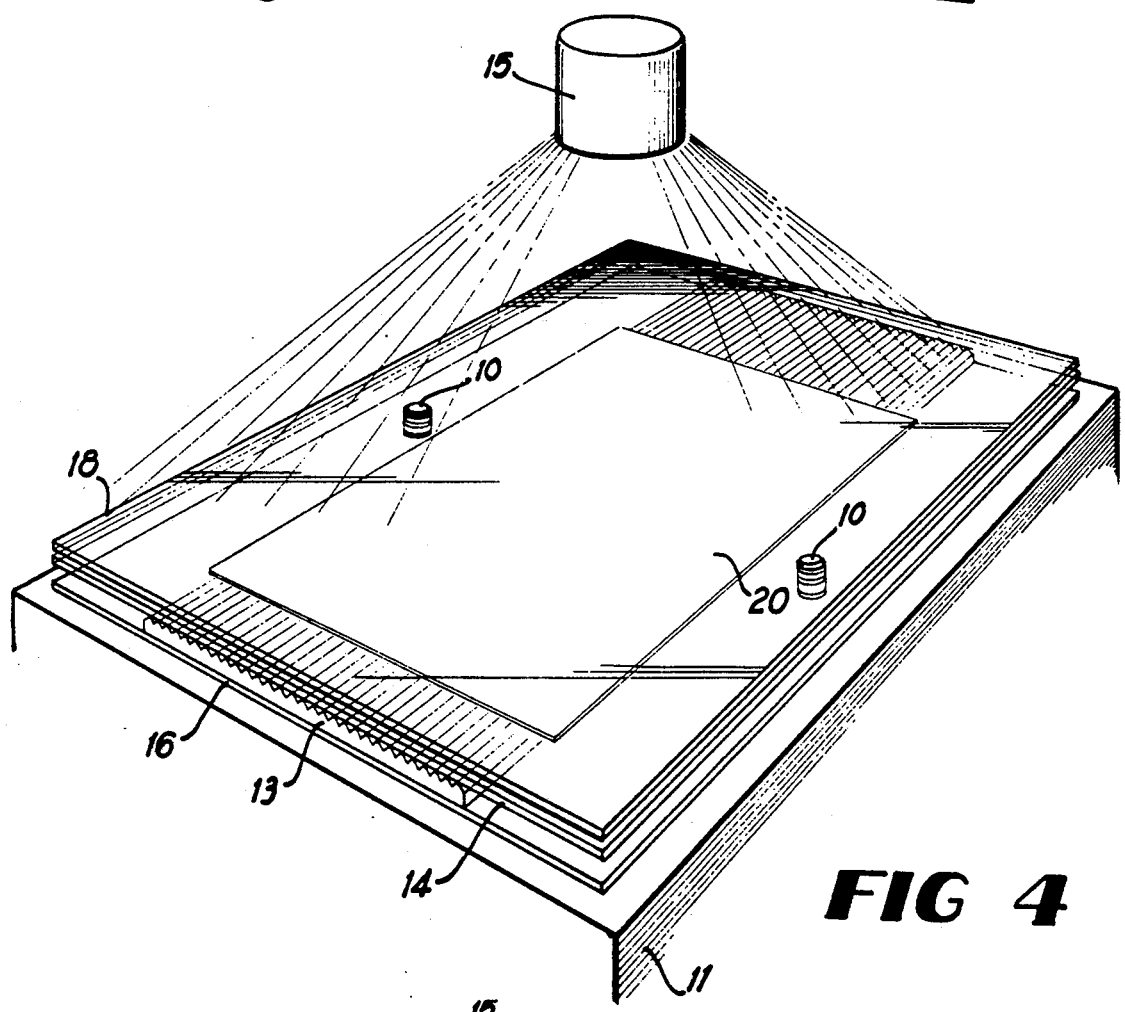
FIG. 4 is a diagram of an alternate method of exposing an image directly through a lenticular lens.

FIG. 4 is a diagram of a variation of the method previously described. In this embodiment, the working negative 16, is exposed to the various image negatives 20, mounted on the transparent carrier 18, through a lenticular lens 13, rather than a grating screen film used above. In exposing the working negative complementary lenses 13 mounted to transparent register carrier 14 may be used to appropriately locate the lenses for exposure of each image.

Figure 5:
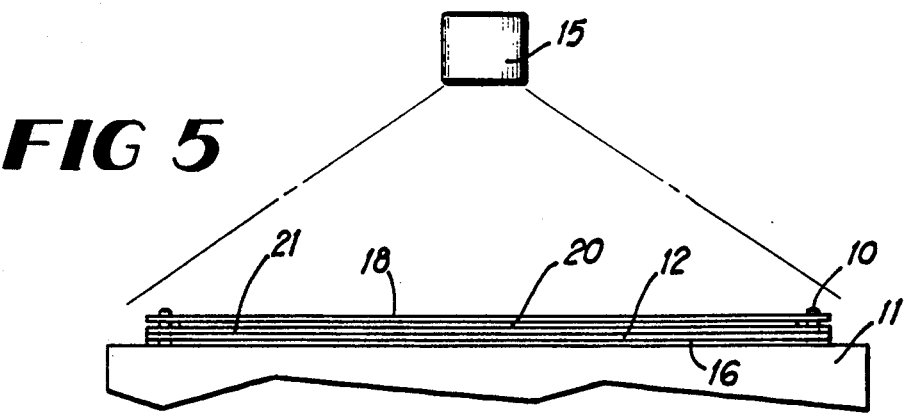
FIG. 5 is a diagram of a further optional step of exposing the image through a mezzo-tint.

FIG. 5 illustrates an additional option which may be included in the method of the present invention. A mezzo-tint 21 may be incorporated in the exposure process of all images 20 to totally or partially cover the interlineated scrambled images. For instance, an overtint screen may be used in a color which is difficult to reproduce, which will further aid in preventing undesired reproduction of the scrambled images by others.

While the invention has been described in detail with particular reference to the preferred embodiments thereof, it will be understood that variations and modifications can be effected within the spirit and scope of the invention as previously described and as defined by the claims.

What is claimed is:

1. A method for producing a positive image for deciphering by a lenticular lens having a specific regular lineation, comprising the steps of:

(a) exposing a first photographic film negative to a first desired image and processing said first film negative to form a first image negative;
(b) exposing a second photographic film negative to a second desired image and processing said second film negative to form a second image negative;
(c) positioning a first grating screen adjacent to and above a working negative, which grating screen contains a number of parallel transparent spaces separated from each other by a number of parallel members so that the spaces and members are disposed in an alternating fashion, each of which spaces and members is of width substantially equal to one-half the width of a lenticule in the lenticular lens;
(d) positioning said first image negative adjacent to and above the first grating screen and exposing said first image negative to the working negative through the first grating screen in order to create a lineated image of said first image negative on said working negative;
(e) positioning an second grating screen, which has members and spaces of dimensions equal to the first grating screen, so that its members substantially cover the working negative lineated image of the first negative image, and its spaces are substantially aligned with unexposed portions of the working negative;
(f) positioning said second image negative adjacent to and above the second grating screen and exposing said second image negative to said working negative through the second grating screen; and
(g) exposing said working negative to form a positive image comprising a first series of parallel panels containing portions of the first image and a second series of parallel panels containing portions of the second image, each of which panels is of substantially one-half the width of a lenticule in the lenticular lens, and which panels in the first series are disposed in an alternating fashion with the panels in the second series, so that when the lenticular lens is aligned appropriately over the positive image, one of the images can be viewed.

2. The method of claim 1 in which the positive image is a printing element for use in printing multiple copies of said image.

3. The method of claim 1 in which the steps of positioning the grating screens comprise using pin-register means.

4. The method of claim 3 in which said first grating screen is created by positioning the lenticular lens lens-side adjacent to a first film negative, exposing the lenticular lens to the first film negative and processing said first film negative, and said second grating screen is created by exposing the first grating screen to a second film negative, registered to each other by pin-register means, and processing said second film negative.

5. The method of claim 1 in which the grating screens are first created by positioning the lenticular lens lens-side adjacent to a film negative, exposing the lenticular lens to the film negative and processing said negative.

6. The method of claim 1 in which said positive image is reproduced on printed matter for purposes of providing security against counterfeit printed matter, and in which the associated lenticular lens is used to view the printed matter in order to determine whether the positive image is present and thus whether the matter is counterfeit.

7. The method of claim 6 in which at least one color overprint tint is printed over the positive image to inhibit counterfeiting through reproduction.

8. The method of claim 7 in which said overprint tint has limited reproducibility, in order to inhibit reproduction.

9. The method of claim 6 in which said printed matter comprises lottery tickets.

10. A method for producing a positive image for deciphering by a lenticular lens having a specific regular lineation, comprising the steps of:
(a) exposing a first photographic film negative to a first desired image and processing said first film negative to form a first image negative;
(b) exposing a second photographic film negative to a second desired image and processing said second film negative to form a second image negative;
(c) positioning a lenticular lens flat side adjacent to a working film negative, positioning the first image negative adjacent to the lens side of the lenticular lens, and exposing the first film negative to the working negative through the lenticular lens;
(d) positioning the lenticular lens one-half lenticule-width orthogonal to the longitudinal direction of the lenses, relative to the position it was in during exposure of the first image negative, and flat side adjacent to the working film negative, positioning the second image negative adjacent to the lens side of the lenticular lens, and exposing the second film negative to the working negative through the lenticular lens; and
(e) exposing said working negative to form a positive image comprising a first series of parallel panels containing portions of the first image and a second series of parallel panels containing portions of the second image, each of which panels is of substantially one-half the width of a lenticule in the lenticular lens and which panels in the first series are disposed in an alternating fashion with the panels in the second series, so that when the lenticular lens is aligned properly over the positive image, one of the images can be viewed.

11. The method of claim 10 in which said positive image is a printing element for use in printing multiple copies of said positive image.

12. The method of claim 10 in which said steps of positioning the lenticular lens comprise using pin-register means.

13. The method of claim 12 in which at least one color overprint tint is printed over the scrambled image to inhibit counterfeiting through reproduction.

14. The method of claim 10 in which said positive image is reproduced on printed matter for purposes of providing security against counterfeit printed matter, and in which the associated lenticular lens is used to view the printed matter in order to determine whether the positive image is present and thus whether the matter is counterfeit.

* * * * *